T. BROWNFIELD.

Carriage-Wheel.

No. 15,554                          Patented Aug. 19, 1856.

Witnesses
G. W. Herzog
J. E. Patton

Inventor
Thomas Brownfield

UNITED STATES PATENT OFFICE.

THOMAS BROWNFIELD, OF GEORGES TOWNSHIP, FAYETTE COUNTY, PENNSYLVANIA.

WHEEL FOR CARRIAGES.

Specification forming part of Letters Patent No. 15,554, dated August 19, 1856; Reissued December 15, 1857, No. 515.

*To all whom it may concern:*

Be it known that I, THOMAS BROWNFIELD, of Georges township, Fayette county, in the State of Pennsylvania, have invented a new and useful Wheel for Wagons, Coaches, Carriages, Buggies, &c.; and I do hereby declare that the following, is a full, clear, and exact description of the construction of the same, reference being had to the annexed drawings, making part of this specification, in which—

Figure 1:
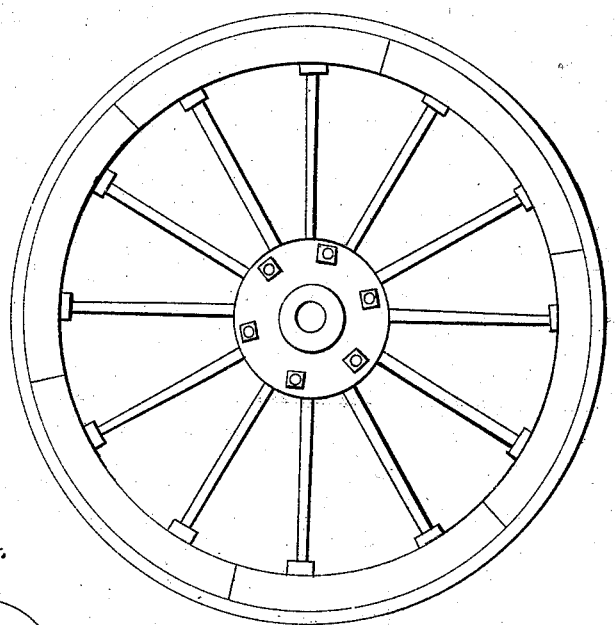
Figure 4:
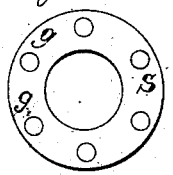
Figure 3:
Figure 2:
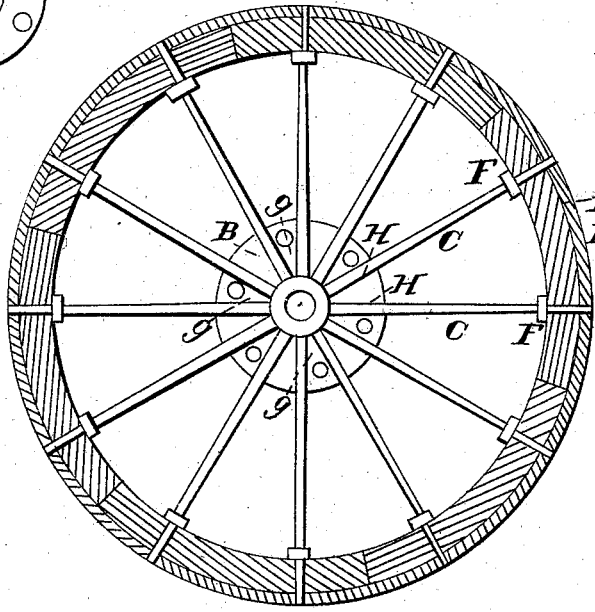

Figure 1 is a perspective view; Fig. 2 a transverse section; Fig. 3 a section of the rim of the nave; Fig. 4 a plate of iron which covers these sections.

A is the nave of the wheel, B the rim in which the spokes are fastened at the hub; C, C, the spokes; D, D, the fellies; G, G, the holes in the rim of the hub; E the tire; F, F, the nuts on the spokes; H, H, the grooves in the rim of the hub.

To enable others skilled in the art, to make my invention, I will proceed to describe its construction.

The hub I make of cast iron in length and size to suit the axle or carriage it is intended for; as shown at A Fig. 2, in the accompanying drawing; on the middle of the hub I make a rim of cast iron two or three inches broad, as shown at B, with holes through it, as shown at G, G, for screw bolts; and grooves also in it to receive the spokes, as shown at B. I make another rim of cast iron constructed of four, six, or eight sections according to the number of spokes, which the wheel contains, through each of these sections, I make a hole for a bolt, as shown at G, G, Fig. 3, and two grooves also to correspond with the grooves in the rim B, as shown at H, H, Fig. 3. Over these sections I put a thin plate of iron Fig. 4, to keep them steady and strengthen the hub. The spokes I make of iron, which is rolled to the proper size, and cut of the exact length; one end I fit in the grooves of the hub, the other end I make smaller to fit the holes in the tire, and cut a screw on it, about three inches from the point, and put a nut on the screw as shown at F F. The tire and fellies I make in the ordinary manner, with as many holes through them as there are to be spokes in the wheel. Wagon wheels may be made in this manner, without the fellies, by having the tire made stronger, so that it will not bend between the spokes; but they are too heavy made in this manner for light carriages.

When the parts are all made as described, I then adjust the fellies in the tire and bore holes through the fellies, from the holes in the tire; then put the nuts on the spokes and screw them on as far up as they will go; then put the ends of the spokes through the fellies and tire; and then put the other end in the grooves of the hub; and then put the rim on which is made in sections Fig. 3; then the iron plate Fig. 4; and then put the screw bolts through the rim in the hub and each of the sections and iron plate, and screw them all firm together; then cut off the ends of the spokes even with the tire, and rivet them.

What I claim as my invention, and desire to secure by Letters Patent, is—

The rim of the hub, which is made in sections; which being constructed in this manner will press on all the spokes, and hold them all firm in the hub, and the iron plate which covers these sections, which will bend and let the sections fit the spokes, with the pressure of the screws, and holds the sections to their places; and the nuts on the spokes, which holds the fellies and tire to their proper places.

THOMAS BROWNFIELD.

Witnesses:
G. W. HERTZOG,
J. E. PATTON.

[FIRST PRINTED 1912.]